(12) United States Patent
Fujita

(10) Patent No.: US 7,092,321 B2
(45) Date of Patent: Aug. 15, 2006

(54) LENS ACTUATOR INCORPORATED IN OPTICAL INFORMATION STORAGE SYSTEM FOR PROMPTLY CANCELING FLUCTUATION OF RADIAL TILT ANGLE OF ROTATING DISC

(75) Inventor: Masayuki Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 198 days.

(21) Appl. No.: 10/139,375

(22) Filed: May 7, 2002

(65) Prior Publication Data

US 2002/0172109 A1 Nov. 21, 2002

(30) Foreign Application Priority Data

May 15, 2001 (JP) ............................. 2001-144291

(51) Int. Cl.
*G11B 7/00* (2006.01)
(52) U.S. Cl. .................................. 369/44.16; 720/685
(58) Field of Classification Search ............. 369/53.19, 369/44.16, 244
See application file for complete search history.

(56) References Cited

U.S. PATENT DOCUMENTS

| 5,748,580 | A | * | 5/1998 | Matsui ..................... 369/44.16 |
| 6,404,728 | B1 | * | 6/2002 | Shinozuka et al. .......... 720/681 |
| 6,449,229 | B1 | * | 9/2002 | Kim et al. ................ 369/53.19 |
| 2002/0071376 | A1 | * | 6/2002 | Kimura et al. ......... 369/112.23 |

FOREIGN PATENT DOCUMENTS

| EP | 287235 A2 | * | 10/1988 |
| JP | H08-87762 A | | 4/1996 |
| JP | H10-21568 A | | 1/1998 |
| JP | H10-320804 A | | 12/1998 |
| JP | 11-306570 A | | 11/1999 |
| JP | 11306570 A | * | 11/1999 |
| JP | 2000-30274 A | | 1/2000 |
| JP | 2000-149292 A | | 5/2000 |

OTHER PUBLICATIONS

English Translation of JP 11306570 A.*
Machine Translation of Sugiyama et al. (JP 2000-149292).*

* cited by examiner

*Primary Examiner*—Brian E. Miller
*Assistant Examiner*—Peter Vincent Agustin
(74) *Attorney, Agent, or Firm*—Sughrue Mion, PLLC

(57) ABSTRACT

A lens actuator keeps an objective lens focused on a track in an information recording layer of an optical disc against fluctuation unavoidable for the optical disc, and has a lens holder, three electromagnetic actuators for moving and tilting the lens holder and three pairs of elastically deformable conductive connecting rods connected to both side surfaces of the lens holder for movably retaining the lens holder over a base plate; since two pairs of elastically deformable conductive connecting rods are symmetrically arranged on upper and lower sides of the remaining pair, the lens holder is smoothly tilted and moved in the radial direction of the optical disc without any tilt, whereby the lens actuator promptly and exactly cancels the fluctuation of the optical disc.

25 Claims, 4 Drawing Sheets

LENS ACTUATOR INCORPORATED IN OPTICAL INFORMATION STORAGE SYSTEM FOR PROMPTLY CANCELING FLUCTUATION OF RADIAL TILT ANGLE OF ROTATING DISC

FIELD OF THE INVENTION

This invention relates to an optical information storage system and, more particularly, to a lens actuator incorporated in an optical disc information storage system for driving an object lens unit for automatic tracking.

DESCRIPTION OF THE RELATED ART

An optical disc information storage system is a data storage facility optically recording, reproducing and erasing pieces of information in an information-recording layer of an optical disk. The optical disc information storage system includes an optical head opposed to a recording surface of the optical disc for the recording, reproducing and erasing. The optical head is broken down into two parts, i.e., an optical system and a lens actuator. At least a light emitting element and a condenser such as an objective lens are incorporated in the optical system. Laser light is emitted from the light emitting element, and is condensed through the condenser onto the information-recording layer. The pieces of information are recorded along a track in the information-recording layer. While the optical system is writing pieces of information in and erasing/reproducing them from the optical disc, the optical disc is driven for rotation, and the lens actuator automatically tracks the laser beam light with a target track in the information recording layer. However, it is impossible to fix the track to the relative position with respect to the optical system in the recording and reproducing. While the optical disc is being driven for rotation, axial runout and radial runout are unavoidable. The track is waved in the up-and-down direction, and is further moved in the radial direction of the optical disc. The lens actuator drives the objective lens in such a manner as to cancel the axial runout and radial runout, thereby making the laser beam light to keep the laser light beam optimum with respect to the track in the rotating optical disc.

The amount of information to be processed by a computer system gets larger and larger, and, accordingly, a large capacity optical disk is required for the computer system. In order to enlarge the memory capacity of the optical disc, the laser light beam is to be reduced in diameter, and two approaches are proposed. The first approach is to replace the current light emitting element with a short-wavelength laser light emitting element. The second approach is to replace the current objective lens with a new objective lens with a large NA (Numerical Aperture).

However, if the large NA objective lens is employed in the optical system of the optical disc information storage system, the margin of radial tilt angle is reduced. The radial tilt angle is defined as "the angle between the optical axis of the laser light beam and a radial line on the recording layer of the optical disc. The lens actuator of the optical head is expected to cancel the fluctuation of the radial tilt angle.

A prior art lens actuator responsive to the fluctuation of the radial tilt angle is disclosed in Japanese Patent Application laid-open No. 11-306570. FIG. 1 shows the structure of the prior art lens actuator disclosed in the Japanese Patent Application laid-open. In FIG. 1, arrows 1 and 2 are indicative of a direction of focusing and a radial direction, and arrow 3 is indicative of the direction of the radial tilting. The radial tilt angle is varied in the radial tilt angle as indicated by the arrow AR3.

The prior art lens actuator is fabricated on a supporting base plate 201, which is generally rectangular parallelepiped configuration. A lens holder 202 retains an objective lens 203 over a hollow space in the central area on the upper surface of the supporting base plate 201, and is connected to a stationary block 204 through four elastically deformable rods 205. The stationary block 204 is fixed to the upper surface of one end portion of the supporting base plate 201, and the elastically deformable rods 205 project from the stationary block 204 toward the lens holder 202.

The prior art lens actuator further includes a focusing coil 206, a tracking coil 207, a focusing yoke/magnet 208 and a tracking yoke/magnet 209. The focusing coil 206 and the tracking coil 207 are fixed to the lens holder 202, and the focusing yoke/magnet 208 and the tracking yoke/magnet 209 are fixed to the supporting base plate 201. The focusing coil 206 and the focusing yoke/magnet 208 form in combination an electromagnetic actuator for the focusing, and the tracking coil 207 and the tracking yoke/magnet 209 constitute an electromagnetic actuator for the tracking. When the focusing coil 206 is energized, force is exerted on the lens holder 202, and the elastically deformable rods 205 permit the lens holder 202 to be moved in the direction of focusing. On the other hand, when the current flows through the tracking coil 207, the electromagnetic force is exerted between the tracking coil 207 and the tracking yoke/magnet 209, and the lens holder 202 is urged in the radial direction of an optical disc. The elastically deformable rods 205 permit the lens holder 202 to be moved in the radial direction.

The prior art lens actuator further includes a pair of tilt coils 211 and a pair of tilt yokes/magnets 212. The tilt coils 211 are provided on both side surfaces of the lens holder 202. The tilt yokes/magnets 212 are upright on the supporting base plate 201, and are opposed to the tilt coils 211, respectively. The tilt coils 211 and the tilt yokes/magnetic 212 constitute an electromagnetic actuator for tilting. When current flows through the tilt coils 211, the electromagnetic force urges the lens holder 201 to tilt in the direction of radial tilting.

The prior art lens actuator disclosed in Japanese Patent Application laid-open No. 11-306570 requires the three electromagnetic actuators for the automatic tracing. As described hereinbefore, the three electromagnetic actuators are independently energized for the focusing, tracking and tilting, and the focusing coil 206, tracking coil 207 and tilt coils 211 are supported by the lens holder 202. This means that the electric power is independently supplied through power supply lines to the focusing coil 206, tracking coil 207 and tilt coils 211. The elastically deformable rods 205 are used for the power supply in the prior art lens actuator. In detail, a pair of conductive layers and an insulating layer sandwiched between the two conductive layers constitute each of the elastically deformable rods 205. The conductive layers are electrically isolated from each other, and are available for the power supply to one of the electromagnetic actuators. The prior art lens actuator has the four elastically deformable rods 205 for supporting the lens holder 202 so that the electric power is independently supplied through the four paths at the maximum. The insulating layer is formed of polyimide in one embodiment, and the conductive layers are formed of copper, copper alloy or beryllium.

A problem is encountered in the prior art lens actuator disclosed in Japanese Patent Application laid-open No.

11-306570 in that the lens holder 202 does not promptly follow the fluctuation in the radial tilt angle. This phenomenon is derived from the insulating layers of the elastically deformable rods 205. When the electromagnetic actuator for tilting is energized, the elastically deformable rods are twisted so as to permit the lens holder 202 to tilt. However, the insulating material has viscoelasticity, and is less promptly responsive to the twisting moment. Thus, the prior art lens actuator can not take up the fluctuation in the radial tilt angle due to the insulating layers used in the elastically deformable rods 205.

Another prior art lens actuator is disclosed in Japanese Patent Application laid-open No. 2000-149292. The prior art lens actuator includes a lens holder movable with respect to a stationary member. The prior art lens actuator also three electromagnetic actuators for focusing, tracking and tilting, and the coils of the electromagnetic actuators are provided in the lens holder together with the objective lens. The lens holder, focusing coil, tracking coil and tilting coil form a movable unit together with an objective lens supported by the lens holder, and the movable unit is supported by a stationary member by means of six elastic rods. The six elastic rods are formed of conductive material, and the electric power is independently supplied through the six elastic rods to the focusing coil, tracking coil and tilting coil. The lens holder has a generally cylindrical shape, and the objective lens is attached to one end portion of the cylindrical lens holder. The cylindrical lens holder has a certain length, and the objective lens is spaced from the cross section at the center in the longitudinal direction of the cylindrical lens holder. Two pairs of elastically deformable rods are respectively connected to both sides of the objective lens, i.e., the one end portion of the cylindrical lens holder, and remaining two elastically deformable rods are respectively connected to both sides of the other end portion of the cylindrical lens holder. Thus, the six elastically deformable rods are asymmetrically arranged with respect to the cross section at the center. The asymmetrical arrangement is preferable for the objective lens, because the six elastically deformable rods tilt the cylindrical lens holder about a center substantially aligned with the principal point of the objective lens.

The prior art lens actuator can promptly follow the fluctuation in radial tilt angle, because the elastically deformable rods are only formed of conductive material. However, another problem is encountered in the prior art lens actuator disclosed in Japanese Patent Application laid-open No. 2000-149292 in that the lens holder tends to be tilted in the tracking due to the unbalance between the amount of elastic force exerted on the one end portion of the lens holder and the amount of elastic force exerted on the other end portion. In detail, the two pairs of elastically deformable rods, i.e., four rods are connected to the one end portion of the lens holder, and only two elastically deformable rods are connected to the other end portion. Although the asymmetric arrangement is conducive to the tilt of the lens holder about the center substantially aligned with the principal point of the objective lens, the unbalance of the elastic force causes the lens holder to be tilted in the tracking, because the two pairs of elastically deformable rods are less expandable and shrinkable rather than the two elastically deformable rods. Moreover, the unbalance makes the tilting motion less smooth.

SUMMARY OF THE INVENTION

It is therefore an important object of the present invention to provide a lens actuator, which promptly cancels fluctuation of an optical disc in the three directions, i.e., the focusing direction, tracking direction and radial tilt direction without unintentional tilt during the cancellation of the radial tilt direction of the fluctuation.

In accordance with one aspect of the present invention, there is provided a lens actuator incorporated in an optical head used for an optical disc driven for relative rotation to the lens actuator, and the lens actuator comprises a lens unit including a lens for condensing light onto a target portion in the optical disc and a lens holder for retaining the lens, a stationary member on which an orthogonal coordinate system is represented by a focusing direction parallel to an axis of rotation in the optical disc, a tracking direction parallel to a radius of curvature of the optical disc and a tangential direction perpendicular to the radius of curvature, a first actuator provided between the lens holder and the stationary member and urging the lens holder in a first direction parallel to the focusing direction, a second actuator provided between the lens holder and the stationary member and urging the lens holder in a second direction parallel to the tracking direction, a third actuator provided between the lens holder and the stationary member and urging a predetermined area of the lens holder to rotate about a third direction parallel to the tangential direction and a plurality of connecting rods formed of elastically deformable material, equivalent to one another from the viewpoint of a strength of materials, and connected between the stationary member and the lens unit in such a manner that the connecting rods are symmetrically arranged on both side surfaces of the lens holder with respect to a center of the predetermined area.

BRIEF DESCRIPTION OF THE DRAWINGS

The features and advantages of the lens actuator will be more clearly understood from the following description taken in conjunction with the accompanying drawings, in which.

DESCRIPTION OF THE PREFERRED EMBODIMENTS

Figure 1:
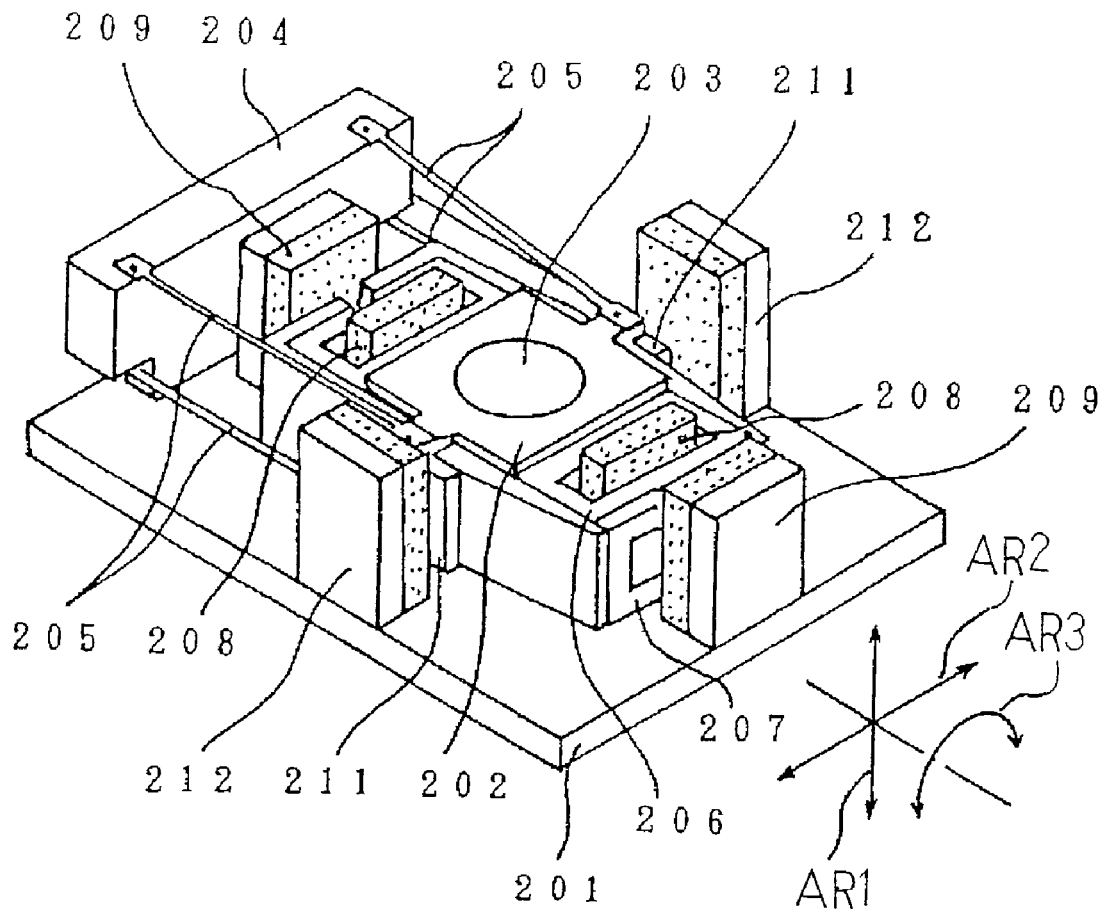
FIG. 1 is a perspective view showing the structure of the prior art lens actuator disclosed in Japanese Patent Application laid-open No. 11-306570.
Figure 2:
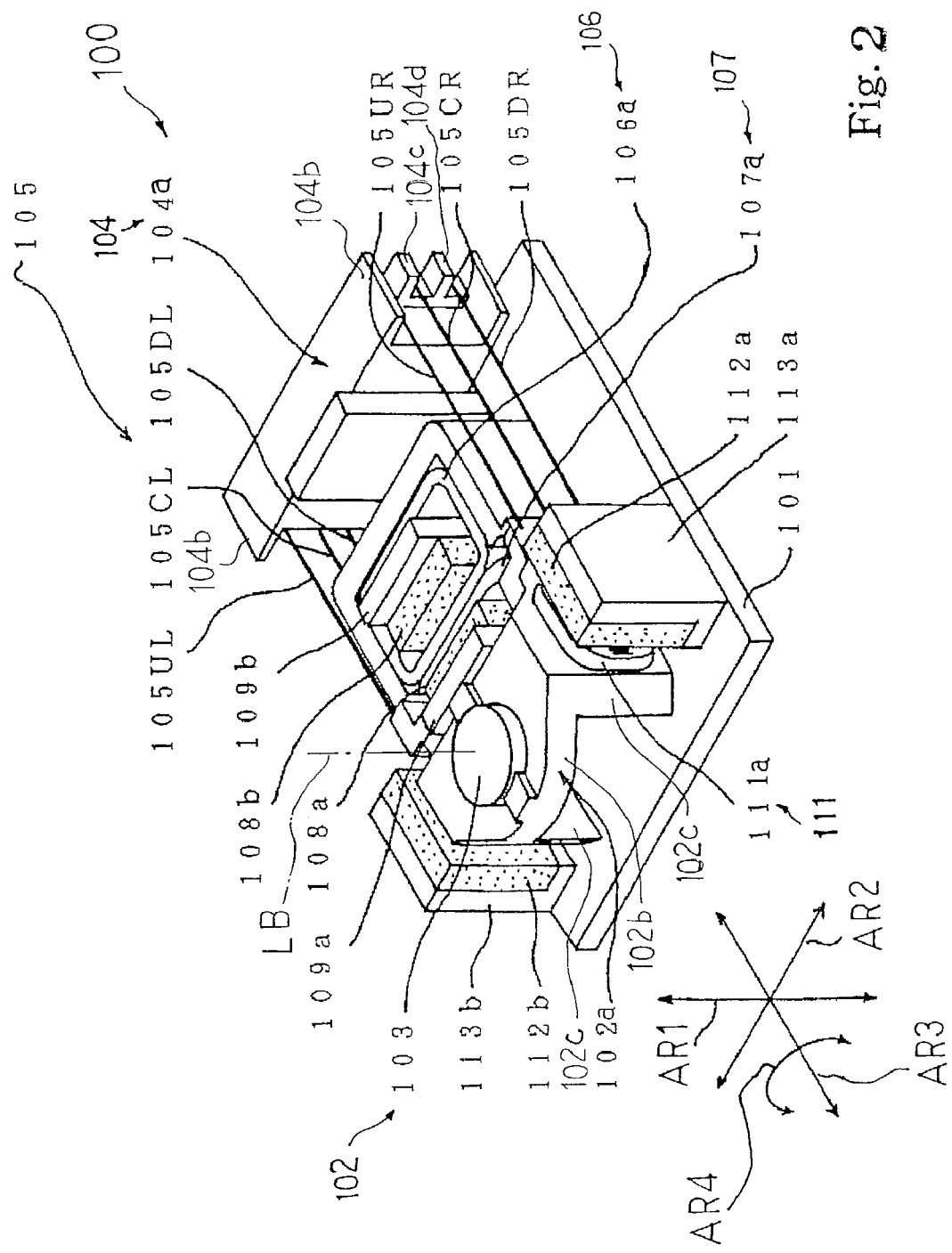
FIG. 2 is a perspective view showing the structure of a lens actuator according to the present invention.
Figure 3:
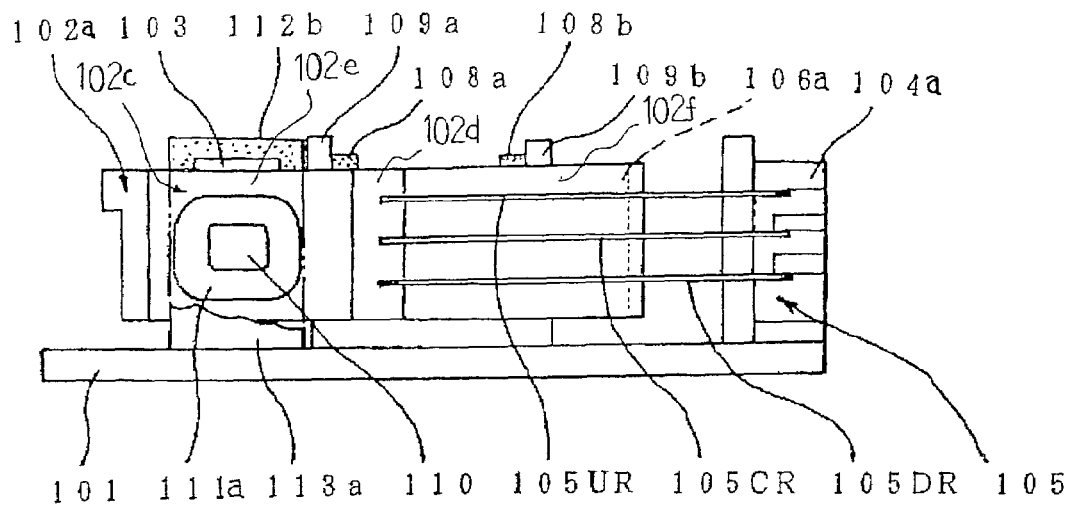
FIG. 3 is a side view showing the structure of the lens actuator viewed in a radial direction.
Figure 4:
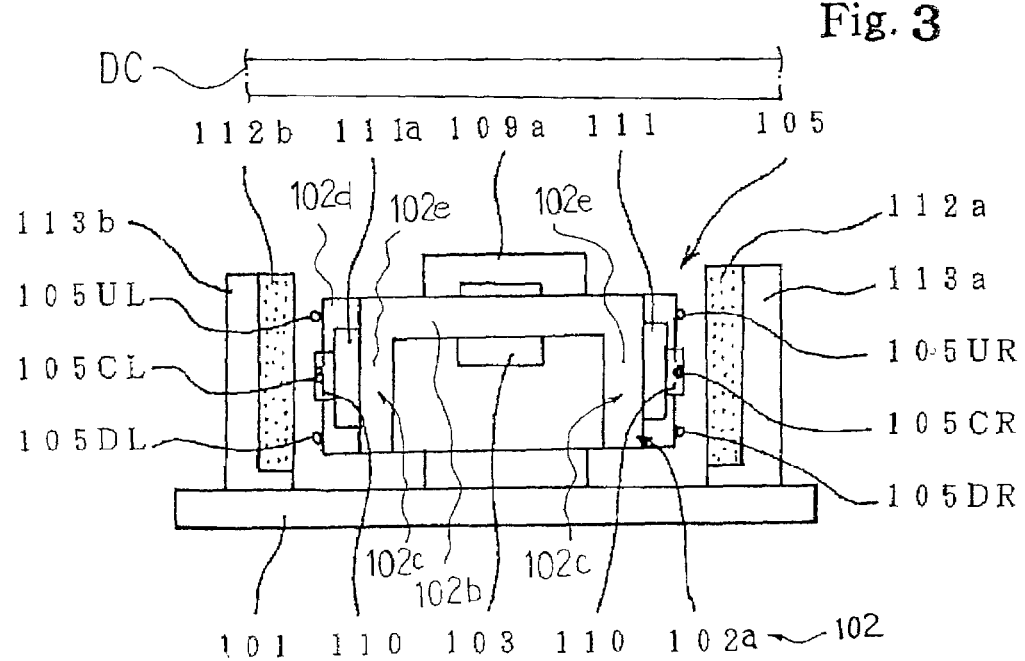
FIG. 4 is a front view showing the structure of the lens actuator viewed in a tangential direction.

Referring to FIGS. 2, 3 and 4 of the drawings, a lens actuator embodying the present invention is designated by reference numeral 100. In FIG. 1, arrows AR1, AR2, AR3 and AR4 are indicative of a focusing direction, a radial direction, a tangential direction and a radial tilt direction, respectively. The focusing direction is in parallel to a laser light beam LB radiated from a light-emitting element (not shown) toward an optical disc DC, and the radial direction and tangential direction are perpendicular to each other on a virtual plane to which the focusing direction is normal. Though not shown in the drawings, the lens actuator 100 is associated with a driving mechanism, which moves the lens actuator 100 in the radial direction by means of an arm. The optical disc DC has an information recording layer, and the information recording layer unavoidable fluctuates in the focusing direction, radial direction and radial tilt direction with respect to the lens actuator 100 due to the axial runout, radial runout and/or the warp of the optical disc DC.

The lens actuator 100 largely comprises a base plate 101, a lens unit 102, a lens supporting structure 104 and three electromagnetic actuators 106/107/111. The lens supporting structure 104 is provided on the base plate 101, and keeps the lens unit 102 movable. The three electromagnetic actuators 106/107/111 are provided between the base plate 101 and the lens unit 102, and are independently energized through the lens supporting structure 104 for moving the lens unit 102.

The electromagnetic actuator 106 gives rise to the movement of the lens unit 102 in the focusing direction AR1, and cancels the vertical component of the fluctuation in the optical disc DC. The electromagnetic actuator 107 gives rise to the movement of the lens unit 102 in the radial direction AR2, and cancels the radial component of the fluctuation in the optical disc DC. The electromagnetic actuator 111 gives rise to the movement of the lens unit 102 in the radial tilt direction AR4, and cancels the radial tilt component of the fluctuation in the lens unit 102.

The base plate 101 has a generally rectangular parallelepiped configuration, and has a longitudinal direction in parallel to the tangential direction AR3 and a lateral direction in parallel to the radial direction. The lens unit 102 is located over one end portion of the base plate 101. The lens supporting structure 104 is fixed to the other end portion of the base plate 101, and projects toward the one end portion so as to be connected to the lens unit 102.

Figure 5:
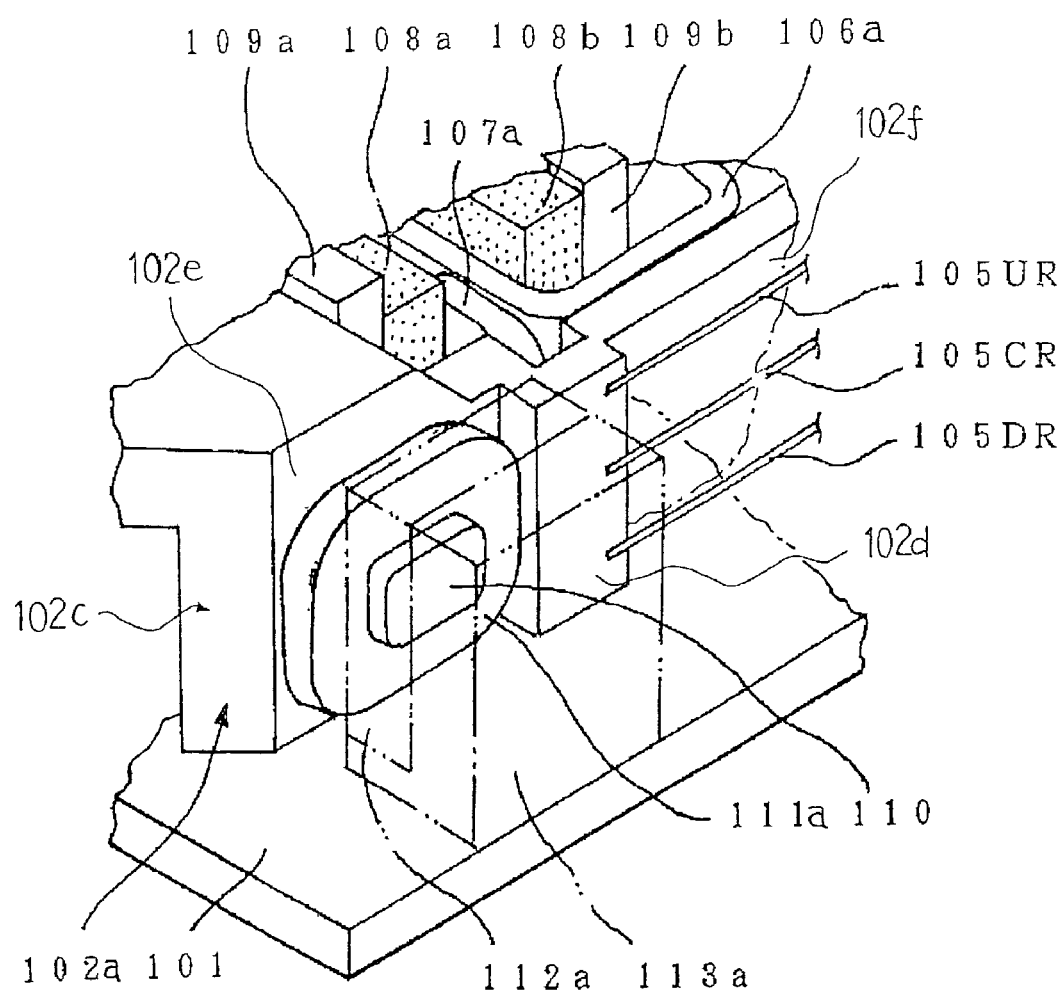
FIG. 5 is a perspective view showing a tilt coil incorporated in the lens actuator.

The lens unit 102 includes a lens holder 102a and an objective lens 103. The lens holder 102a has an upper flat portion 102b and side wall portions 102c. The objective lens 103 is fixed to the upper flat portion 102b, and the side wall portions 102c downwardly project from both sides of the upper flat portion 102b. The objective lens 103 is located at a suitable position so as to cause the laser light beam LB is fallen onto the information recording layer of the optical disc DC. The distance between the side wall portions 102c is not constant. The wide wall portions 102c sideward project at intermediate sub-portions 102d, and both end sub-portions 102e/102f are inwardly retracted from the intermediate sub-portions 102d as will be seen in FIG. 5.

The lens supporting structure 104 includes a block 104a and three pairs of conductive connecting rods 105UL/105UR, 105CL/105CR and 105DL/105DR. The block 104a is fixed to the one end portion of the base plate 101, and pairs of fin portions 104b/104c/104d sideward project from the boss portion of the block 104a. The conductive connecting rods 105UL, 105UR, 105CL, 105CR, 105DL and 105DR are formed of conductive metal or alloy, and are equal in diameter and length to one another. The conductive connecting rods 105UL/105UR, 105CL/105CR and 105DL/105DR are connected between the block 104a and the lens holder 102a so as to retain the lens holder 102a in a cantilever fashion and independently supply electric power to the electromagnetic actuators 106/107/111. The conductive connecting rods 105UL/105UR, 105CL/105CR and 105DL/105DR have elasticity. When the electromagnetic actuators 106/107/111 move the lens holder 102a for canceling the fluctuation in the optical disc DC, the conductive connecting rods 105UL/105UR, 105CL/105CR and 105DL/ 105DR are elastically deformed so as to permit the electromagnetic actuators 106/107/111 to move the lens holder 102a.

In detail, the conductive connecting rods 105CL/105CR of the first pair are connected between the fin portions 104c and the intermediate sub-portions 102d, and extend in the tangential direction AR3. The conductive connecting rods 105CL/105CR are equally spaced from the upper surface of the base plate 101, and are substantially parallel to each other. The conductive connecting rods 105UL/105UR of the second pair are connected between the fin portions 104b and the intermediate sub-portions 102d, and also extend in the tangential direction AR3. The conductive connecting rods 105UL/105UR are upwardly spaced from the conductive connecting rods 105CL/105CR by a predetermined distance, and are substantially parallel to the associated conductive connecting rods 105CL/105CR. The conductive connecting rods 105DL/105DR of the third pair are connected between the fin portions 104d and the intermediate sub-portions 102d, and also extend in the tangential direction AR3. The conductive connecting rods 105DL/105DR are downwardly spaced from the conductive connecting rods 105CL/105CR by the predetermined distance, and are substantially parallel to the associated conductive connecting rods 105CL/105CR. Thus, the first pair of conductive connecting rods 105CL/ 105CR is equally spaced from the second pair of conductive connecting rods 105UL/105UR and the third pair of conductive connecting rods 105DL/105DR in the focusing direction AR1, and all the conductive connecting rods 105UL/105UR, 105CL/105CR and 105DL/105DR are arranged in parallel to one another. Thus, the pair of conductive connecting rods 105UL/105UR and the pair of conductive connecting rods 105DL/105DR are symmetrically arranged on both sides of the pair of conductive connecting rods 105CL/105CR.

Electric power is independently supplied through the three pairs of conductive connecting rods 105UL/105UR, 105CL/105CR and 105DL/105DR to the electromagnetic actuators 106/107/111 so that the electromagnetic actuators 106/107/111 cancel the three components of the fluctuation.

The conductive connecting rods 105UL/105UR, 105CL/ 105CR and 105DL/105DR are provided on both side surfaces of the lens actuator 100. This feature is conducive to reduction in thickness of the lens actuator 100, because the manufacturer can reduce the lens holder 102a as low as the electromagnetic actuator 111.

The electromagnetic actuators 106/107 include a focusing coil 106a, a tracking coil 107a, focusing/tracking magnet pieces 108a/108b and focusing/tracking yokes 109a/109b. The focusing coil 106a is wound in parallel to the upper surface of the base plate 101, and has the thickness in the focusing direction AR1. On the other hand, the tracking coil 107a is wound in parallel to a plane perpendicular to the upper surface of the base plate 101, and has the thickness in the tangential direction. The focusing/tracking coils 106a/ 107a are fixed to the lens holder 102a, and are adjacent to each other.

The focusing/tracking magnet pieces 108a/108b are respectively paired with the focusing/tracking yokes 109a/ 109b, and the focusing/tracking magnet-yoke pairs 108a/ 109a and 108b/109b are fixed to the base plate 101. One of the focusing/tracking magnet-yoke pairs 108b/109b is located inside the focusing coil 106a, and the other focusing/ tracking magnet-yoke pair 108a/109a is located between the tracking coil 107a and the upper flat portion 102b. Thus, the focusing/tracking magnet-yoke pairs 108a/109a and 108b/ 109b are arranged in such a manner as to sandwich the focusing coil 106a and the tracking coil 107a therebetween. The focusing/tracking magnet pieces 108a/108b generate magnetic fields, and cause electric current, which flows through the focusing/tracking coils 106a/107a, to generate electromagnetic forces to be exerted on the lens holder 102a. The focusing/tracking yokes 109a/109b effectively distribute the magnetic field strength, and complete magnetic circuits.

The electromagnetic actuator 111 includes a pair of lugs 110, a pair of tilting coils 111a, a pair of tilting magnet pieces 112a/112b and a pair of tilting yokes 113a/113b. The lugs 110 sideward project from the end sub-portions 102e, respectively, and the tilting coils 111a are respectively wound around the lugs 110. In other words, the tilting coils 111a are wound on planes defined by the focusing and tangential directions so as to be stacked in the radial direction AR2. The lugs 110 are located in such a manner that the centers of the tilting coils 111a are on the extension lines of the conductive connecting rods 105CL/105CR, respectively. The lugs 110 are thicker than the tilting coils 111a, and have end surfaces projecting from the tilting coils 111a. The end surfaces of the lugs 110 are substantially perpendicular to the upper surface of the base plate 101.

The tilting magnetic pieces 112a/112b are assembled with the tilting yokes 113a/113b, respectively, and the tiling magnetic piece-yoke assemblies 112a/113a and 112b/113b are provided on both sides of the lens unit 102a in such a manner that the tilting coils 111a are opposed to the tilting magnetic pieces 112a/112b, respectively. The tilting magnetic piece-yoke assemblies 112a/113a and 112b/113b are fixed to the base plate 101, and the lugs 110 and, accordingly, the tilting coils 111a are slightly spaced from the tilting magnetic pieces 112a/112b, respectively.

The electromagnetic actuators 106/107/111 are independently energized through the pairs of conductive connecting rods 105UL/105UR, 105CL/105CR and 105DL/105DR so as to cancel the fluctuation in the optical disc DC.

When the electric current flows through the focusing coil 106a, the focusing/tracking magnet pieces-yokes 108a/109a and 108b/109b cause the electromagnetic force elastically to deform the conductive connecting rods 105UL/105UR, 105CL/105CR and 105DL/105DR, and the conductive connecting rods 105UL/105UR, 105CL/105CR and 105DL/105DR give rise to the movement of the lens holder 102a in the focusing direction AR1. Thus, the vertical component of the fluctuation is canceled through the movement of the lens holder 102a in the focusing direction AR1, and the laser light beam LB is continuously focused on the information recording layer.

When the electric current flows through the tracking coil 107a, the focusing/tracking magnet piece-yoke pairs 108a/109a and 108b/109b cause the electromagnetic force elastically to deform the conductive connecting rods 105UL/105UR, 105CL/105CR and 105DL/105DR, and the conductive connecting rods 105UL/105UR, 105CL/105CR and 105DL/105DR give rise to the movement of the lens holder 102a in the tracking direction AR2. The radial component of the fluctuation is canceled through the movement of the lens holder 102a in the radial direction AR2, and the objective lens 103 keeps the optical axis aligned to the track in the information recording layer. Since the three pairs of conductive connecting rods 105UL/105UR, 105CL/105CR and 105DL/105DR are symmetrically arranged on both side surfaces of the lens holder 102a, the lens holder 102a is never tilted.

When the electric current flows through the tilting coils 111a, the tilting magnetic piece-yoke assemblies 112a/113a and 112b/113b cause the electromagnetic force elastically twist the conductive connecting rods 105UL/105UR, 105CL/105CR and 105DL/105DR, and the conductive connecting rods 105UL/105UR, 105CL/105CR and 105DL/105DR give rise to the tilt of the lens holder 102a. The variation of radial tilt angle is canceled through the movement of the lens holder 102a in the radial tilt direction AR4, and the objective lens 103 keeps the optical axis aligned to the track in the information recording layer.

As described hereinbefore, the tilting coils 111a are on the extension lines of the conductive connecting rods 105CL/105CR, and the conductive connecting rods 105UL/UR and the conductive connecting rods 105DL/105DR are equally spaced from the conductive connecting rods 105CL/105CR by the predetermined distance. When the electromagnetic actuator 111 gives rise to the twisting motion in the conductive connecting rods 105UL/105UR, 105CL/105CR and 105DL/105DR, the lens holder 102a is tilted about a center on a virtual line on a virtual plane defined by the conductive connecting rods 105 CL and 105 CR, and the conductive connecting rods 105UL/105DL are twisted in a certain direction opposite to the twisting direction of the associated conductive connecting rods 105DL/105 DR, respectively. Thus, the twisting motion is balanced between the conductive connecting rods 105UL/105DL and the conductive connecting rods 105DL/105 DR, and enhances the stability in the cancellation of the radial tilt component.

The end surfaces of the lugs 110 set limits to the lens holder 102a in the cancellation of the fluctuation, and serve as a stopper. When a large amount of current flows through the tracking coil 107, the electromagnetic actuator 107 tries widely to move the lens holder 102a in the radial direction AR2. The end surface of one of the lugs 110 is brought into contact with the tilting magnetic piece 112a or 112b, and the tilting magnetic piece 112a or 112b does not permit the electromagnetic actuator 107 to move the lens holder 102a therebeyond. The gap between the end surfaces and the tilting magnetic pieces 112a/112b is adjusted to a value less than a critical value at which the conductive connecting rods 105UL/105UR, 105CL/105CR and 105DL/105DR are broken. Thus, the end surfaces and the tilting magnetic pieces 112a/112b prevent the conductive connecting rods 105UL/105UR, 105CL/105CR and 105DL/105DR from the damage, and serve as a stopper.

The end surfaces and the tilting magnetic pieces 112a/112b also serve as a stopper against excess radial tilt motion. Even though a large amount of current makes the electromagnetic actuator 111 to give rise to the twisting motion in the conductive connecting rods 105UL/105UR, 105CL/105CR and 105DL/105DR over a critical twisting angle, the end surfaces of the lugs 110 are brought into contact with the tilting magnetic pieces 112a, and the conductive connecting rods 105UL/105UR, 105CL/105CR and 105DL/105DR stop twisting before the critical twisting angle.

As will be appreciated from the foregoing description, the lens holder 102a is connected to a stationary block by means of the three pairs of elastically deformable connecting rods symmetrically arranged, i.e., two pairs of elastically deformable connecting rods are equally spaced from the remaining pair of elastically deformable connecting rods on opposite sides of the remaining pair. When the tracking actuator is energized, the tracking actuator moves the lens holder in the radial direction, and the three pairs of connecting rods are elastically deformed. The three pairs of connecting rods do not rive rise to any tilt in the lens holder 102a, because the internal stress of the pair of connecting rods on the upper side of the remaining pair is approximately equal to the internal stress of the pair of connecting rods on the lower side. Moreover, when the tilting actuator is energized, the tilting actuator gives rise to tilt about the center line on the virtual plate defined by the remaining pair of elastically deformable connecting rods. The tilt gives rise to twisting motion in the pairs of elastically deformable connecting rods. The symmetrical arrangement makes the twisting motion on both sides of the remaining pair in opposite directions. The twisting motion of the pair of connecting rods on the upper side of the remaining pair is well balanced with the twisting motion of the pair of connecting rods on the lower side of the remaining pair. This results in that the lens actuator according to the present invention promptly cancels the radial tilting component of the fluctuation in the optical disc DC.

Moreover, the end surfaces of the lugs 110 are spaced from the tilting magnet pieces by a value less than the critical value at which the connecting rods are broken. The lugs 110 and the tilting magnetic pieces 112*a*/112*b* as a whole constitute a stopper against the excess deformation of the connecting rods, and the stopper prevents the lens actuator from the damage.

Finally, the connecting rods are arranged on both side surfaces of the lens holder 102*a* so that the manufacturer can reduce the lens holder 102*a* to the height equal to that of the tilting coils 111*a*. This results in a compact lens actuator.

Although a particular embodiment of the present invention has been shown and described, it will be apparent to those skilled in the art that various changes and modifications may be made without departing from the spirit and scope of the present invention.

For example, the conductive connecting rods 105UL/105UR, 105CL/105CR and 105DL/105DR may be replaced with insulating connecting rods and suitable leads independently supplying the electric power to the electromagnetic actuators 106/107/111. In this instance, the insulating connecting rods are to be arranged as similar to the conductive connecting rods 105UL/105UR, 105CL/105CR and 105DL/105DR.

Any kind of actuators is available for the lens actuator in so far as the actuators urge the lens holder in predetermined directions. In other words, the electromagnetic actuators 106/107/111 do not set any limit on the present invention.

The symmetrical arrangement may be achieved by using connecting rods more than or less than six.

What is claimed is:

1. A lens actuator incorporated in an optical head used for an optical disc driven for relative rotation to said lens actuator, comprising:
    a lens unit including a lens for condensing light onto a target portion in said optical disc and a lens holder for retaining said lens;
    a stationary member on which an orthogonal coordinate system is represented by a focusing direction parallel to an axis of rotation in said optical disc, a tracking direction parallel to a radius of curvature of said optical disc and a tangential direction perpendicular to said radius of curvature;
    a first actuator provided between said lens holder and said stationary member, and urging said lens holder in a first direction parallel to said focusing direction;
    a second actuator provided between said lens holder and said stationary member, and urging said lens holder in a second direction parallel to said tracking direction;
    a third actuator provided between said lens holder and said stationary member, and urging a predetermined area of said lens holder to rotate about a third direction parallel to said tangential direction; and
    a plurality of connecting rods formed of elastically deformable material, equivalent to one another from the viewpoint of a strength of materials, and connected between said stationary member and said lens unit in such a manner that the connecting rods are arranged on opposite side surfaces of said lens holder;
    wherein said third actuator includes two coils respectively fixed to said opposite side surfaces so as to be wound in parallel to said opposite side surfaces and two magnetic pieces fixed to said stationary member so as to be opposed to said two coils, respectively, wherein said two coils are wound about respective centers serving as said center of said predetermined area;
    wherein said connecting rods are conductive;
    wherein each of said connecting rods disposed on a first side surface of said lens holder is paired with one of said connecting rods disposed on an opposite side surface of said lens holder to define pairs of connecting rods;
    wherein each pair of connecting rods is used to supply electric power to one of said actuators and each of said actuators is supplied with electric power by a separate pair of connecting rods; and
    wherein the connecting rods are symmetrically arranged about a plane formed by the radial and tangential directions.

2. The lens actuator as set forth in claim 1, in which said plurality of connecting rods are equal in dimensions to one another.

3. The lens actuator as set forth in claim 2, in which said plurality of connecting rods are divided into two sets of connecting rods connected between one of said both side surfaces and said stationary member and between the other of said both side surfaces and said stationary member, respectively.

4. The lens actuator as set forth in claim 3, in which the number of connecting rods of each of said two sets is an odd number, and one of said connecting rods of said each of said two sets has an extension line crossing a line passing through said center.

5. The lens actuator as set forth in claim 4, in which said odd number is three.

6. The lens actuator as set forth in claim 5, in which the three connecting rods of one of said two sets are respectively paired with the three connecting rods of the other of said two sets so as to form three pairs of connecting rods, and said first, second and third actuators are independently energized through said three pairs of connecting rods, respectively.

7. The lens actuator as set forth in claim 6, in which said first, second and third actuators have coils and magnet pieces respectively associated with said coils so that electric current is independently supplied through said three pairs of connecting rods to said first, second and third actuators.

8. The lens actuator as set forth in claim 7, in which said third actuator includes two coils respectively fixed to said both side surfaces so as to be wound in parallel to said both side surfaces and two magnetic pieces fixed to said stationary member so as to be opposed to said two coils, respectively, wherein said two coils are wound about respective centers serving as said center of said predetermined area.

9. The lens actuator as set forth in claim 1, further comprising a stopper provided between said lens holder and said stationary member so as to set a limit to a range in which said lens holder is moved.

10. The lens actuator as set forth in claim 9, in which said stopper includes lugs sideward projecting from said both side surfaces, respectively, and rigid blocks fixed to said stationary member and opposed to said lugs, respectively.

11. The lens actuator as set forth in claim 10, in which said third actuator includes coils respectively wound in parallel to said both side surfaces about said lugs and magnet pieces forming parts of said rigid blocks, and said lugs are spaced from said both side surfaces wider than said coils.

12. The lens actuator as set forth in claim 1, wherein the plane formed by the radial and tangential directions is disposed through a central pair of said connecting rods and the remaining connecting rods are symmetrical about the central pair of connecting rods.

13. A lens actuator incorporated in an optical head used for an optical disc driven for relative rotation to said lens actuator, comprising:
- a lens unit including a lens for condensing light onto a target portion in said optical disc and a lens holder for retaining said lens;
- a stationary member on which an orthogonal coordinate system is represented by a focusing direction parallel to an axis of rotation in said optical disc, a tracking direction parallel to a radius of curvature of said optical disc and a tangential direction perpendicular to said radius of curvature;
- a first actuator provided between said lens holder and said stationary member, and urging said lens holder in a first direction parallel to said focusing direction;
- a second actuator provided between said lens holder and said stationary member, and urging said lens holder in a second direction parallel to said tracking direction;
- a third actuator provided between said lens holder and said stationary member, and urging a predetermined area of said lens holder to rotate about a third direction parallel to said tangential direction; and
- a plurality of connecting rods formed of elastically deformable material, equivalent to one another from the viewpoint of a strength of materials, and connected between said stationary member and said lens unit in such a manner that the connecting rods are arranged on opposite side surfaces of said lens holder;
- wherein said first, second and third actuators electromagnetically generate forces to be exerted on said lens holder;
- wherein each of said connecting rods disposed on one side surface of said lens holder is paired with one of said connecting rods disposed on the opposite side surface of said lens holder to define a pair of connecting rods; and
- wherein each pair of connecting rods independently supplies electric power to one of said first actuator, second actuator and said third actuator;
- wherein said first actuator, said second actuator and said third actuator are each supplied with electric power by a separate pair of connecting rods; and
- wherein the connecting rods are symmetrically arranged about a plane formed by the radial and tangential directions.

14. The lens actuator as set forth in claim 13, in which said third actuator includes two coils respectively fixed to said both side surfaces so as to be wound in parallel to said both side surfaces and two magnetic pieces fixed to said stationary member so as to be opposed to said two coils, respectively, wherein said two coils are wound about respective centers serving as said center of said predetermined area.

15. The lens actuator as set forth in claim 13, in which said plurality of connecting rods are formed of conductive metal or conductive alloy.

16. The lens actuator as set forth in claim 13, wherein the plane formed by the radial and tangential directions is disposed through a central pair of said connecting rods and the remaining connecting rods are symmetrical about the central pair of connecting rods.

17. A lens actuator incorporated in an optical head used for an optical disc driven for relative rotation to said lens actuator, comprising:
- a lens unit including a lens for condensing light onto a target portion in said optical disc and a lens holder for retaining said lens;
- a stationary member on which an orthogonal coordinate system is represented by a focusing direction parallel to an axis of rotation in said optical disc, a tracking direction parallel to a radius of curvature of said optical disc and a tangential direction perpendicular to said radius of curvature;
- a first electromagnetic actuator having a first coil fixed to said lens holder and a first magnetic piece fixed to said stationary member, and urging said lens holder in a first direction parallel to said focusing direction;
- a second electromagnetic actuator having a second coil fixed to said lens holder and a second magnetic piece fixed to said stationary member, and urging said lens holder in a second direction parallel to said tracking direction;
- a third electromagnetic actuator having third coils fixed to both side surfaces of said lens holder so as to wound in parallel to said both side surfaces and third magnetic pieces fixed to said stationary member so as to be opposed to said third coils, and urging said lens holder to rotate about a third direction parallel to said tangential direction; and
- two sets of connecting rods formed of elastically deformable material, equivalent to one another from the viewpoint of a strength of materials, and connected between said stationary member and said both side surfaces of said lens holder in such a manner that a center of each of said third coils is on an extension line of a certain connecting rod
- wherein each of said connecting rods disposed on a first side surface of said lens holder are paired with one of said connecting rods disposed on an opposite side surface of said lens holder to define pairs of connecting rods;
- wherein each pair of connecting rods supplies power to one of said first coils, said second coils and said third coils; and
- wherein said first coils, said second coils and said third coils are each supplied with electric power by a separate pair of connecting rods.

18. The actuator as set forth in claim 17, in which said elastically deformable material is electrically conductive so that electric current is independently supplied through said two sets of connecting rods to said first, second and third coils.

19. The actuator as set forth in claim 18, in which said first, second and third electromagnetic actuators have respective yokes associated with said first, second and third magnetic pieces for completing magnetic circuits.

20. The actuator as set forth in claim 18, in which the number of connecting rods of each of said two sets is an odd number.

21. The actuator as set forth in claim 17, further comprising a stopper provided between said lens holder and said stationary member so as to set a limit to a range in which said lens holder is moved.

22. The lens actuator as set forth in claim 21, in which said stopper includes lugs sideward projecting from said both side surfaces, respectively, and rigid blocks fixed to said stationary member and opposed to said lugs, respectively.

23. The lens actuator as set forth in claim 17, wherein the extension lines of the certain connecting rods are imaginary lines extending in the same direction as the certain connecting rods.

24. The lens actuator as set forth in claim 17, wherein the remaining
connecting rods of said two sets of connecting rods are symmetrically arranged with respect to said certain connecting rods.

25. The lens actuator as set forth in claim 17, wherein the connecting rods are symmetrically arranged about a plane formed by the radial and tangential directions.

* * * * *